US012105475B2

(12) United States Patent
Charbon

(10) Patent No.: US 12,105,475 B2
(45) Date of Patent: Oct. 1, 2024

(54) BALANCE-SPRING FOR HOROLOGICAL MOVEMENT AND METHOD FOR MANUFACTURING SAME

(71) Applicant: Nivarox-FAR S.A., Le Locle (CH)

(72) Inventor: Christian Charbon, Chézard-St-Martin (CH)

(73) Assignee: NIVAROX-FAR S.A., Le Locle (CH)

( * ) Notice: Subject to any disclaimer, the term of this patent is extended or adjusted under 35 U.S.C. 154(b) by 801 days.

(21) Appl. No.: 17/084,210

(22) Filed: Oct. 29, 2020

(65) Prior Publication Data

US 2021/0200153 A1 Jul. 1, 2021

(30) Foreign Application Priority Data

Dec. 31, 2019 (EP) .................................... 19220163

(51) Int. Cl.

*G04B 17/06* (2006.01)
*G04B 17/22* (2006.01)
*G04D 3/00* (2006.01)

(52) U.S. Cl.

CPC ........... *G04B 17/066* (2013.01); *G04B 17/06* (2013.01); *G04B 17/063* (2013.01); *G04B 17/227* (2013.01); *G04D 3/0041* (2013.01); *G04D 3/0069* (2013.01)

(58) Field of Classification Search

CPC .. G04B 17/066; G04B 17/063; G04B 17/227; G04D 3/0041; G04D 3/0069

See application file for complete search history.

(56) References Cited

U.S. PATENT DOCUMENTS

| | | | | |
|---|---|---|---|---|
| 3,974,001 A * | 8/1976 | Steinemann | C22C 27/04 420/466 |
| 2002/0191493 A1* | 12/2002 | Hara | G04B 1/145 368/140 |
| 2015/0261187 A1* | 9/2015 | Hessler | G04B 17/06 368/170 |
| 2015/0301502 A1* | 10/2015 | Cusin | G04B 17/227 368/171 |
| 2018/0373202 A1* | 12/2018 | Charbon | C22C 14/00 |
| 2019/0196406 A1 | 6/2019 | Charbon | |

FOREIGN PATENT DOCUMENTS

| | | | |
|---|---|---|---|
| CN | 110007582 | A | 7/2019 |
| EP | 1 039 352 | A1 | 9/2000 |
| EP | 1 039 352 | B1 | 10/2003 |
| EP | 1083243 | A3 | 3/2006 |
| EP | 3 502 288 | A1 | 6/2019 |
| JP | 60-004879 | A | 1/1985 |
| JP | 2019-113549 | A | 7/2019 |
| RU | 2697060 | C1 | 8/2019 |
| TW | I 615 690 | B | 2/2018 |
| WO | 2015/189278 | A3 | 12/2015 |
| WO | 2018/172164 | A1 | 9/2018 |

OTHER PUBLICATIONS

Schulz, K.J., Piatak, N.M., and Papp, J.F., 2017, Niobium and tantalum, Chap. M, “Critical mineral resources of the United States: U.S. Geological Survey Professional Paper 1802”, p. M1-M34, https://doi.org/10.3133/pp1802M (Year: 2017).*
Excerpt of Wikipedia article “Ferromagnetism”, captured by the Internet Archive Mar. 11, 2016 (Year: 2016).*
Excerpt from Wikipedia article “Vanadium”, captured by the Internet Archive Nov. 30, 2019 (Year: 2019).*
Kyoji Tachikawa, “Metallic Superconductors [2]—Superconducting Alloy Wires”, Teion Kogaku (J. Cryo. Soc. Jpn.), 2010, vol. 45, No. 1, 14 pages total.
Office Action dated Jun. 8, 2021 from the Patent Office of the Russian Federation in RU Application No. 2020142723/28.
European Search Report dated Aug. 11, 2020.

* cited by examiner

*Primary Examiner* — Edwin A. Leon
*Assistant Examiner* — Sean R Brannon
(74) *Attorney, Agent, or Firm* — Sughrue Mion, PLLC

(57) ABSTRACT

A balance-spring intended to equip a balance of an horological movement, comprising a core made of Nb—Ti made from an alloy consisting of: niobium: balance to 100% by weight, titanium: between 5 and 95% by weight, traces of elements chosen from the group consisting of O, H, C, Fe, Ta, N, Ni, Si, Cu, Al, each of said elements being present in a quantity between 0 and 1600 ppm by weight, the total quantity formed by all of said elements being between 0% and 0.3% by weight, wherein the core made of Nb—Ti is coated with a layer of niobium, said layer of niobium having a thickness between 20 nm and 10 μm.

6 Claims, No Drawings

BALANCE-SPRING FOR HOROLOGICAL MOVEMENT AND METHOD FOR MANUFACTURING SAME

CROSS-REFERENCE TO RELATED APPLICATION

This application claims priority to European Patent Application No. 19220163.0 filed Dec. 31, 2019, the entire contents of which are incorporated herein by reference.

FIELD OF THE INVENTION

The invention relates to a method for manufacturing a balance-spring intended to equip a balance of an horological movement and the balance-spring coming from the method.

BACKGROUND OF THE INVENTION

The manufacturing of balance-springs for horology is faced with constraints that are often incompatible at first glance:

necessity of obtaining a high elastic limit, ease of processing, in particular of drawing and of rolling, excellent fatigue strength, stability of performance over time, small cross-sections.

The creation of balance-springs is further centred on the problem of thermal compensation, in such a way as to guarantee regular chronometric performance. For this, a thermoelastic coefficient close to zero must be obtained. It is also sought to create balance-springs having a limited sensitivity to magnetic fields.

New balance-springs have been developed on the basis of alloys of niobium and titanium. However, these alloys pose problems of sticking and of seizing in draw-plates and against rollers, which makes them almost impossible to transform into fine wires by the standard methods used, for example, for steel.

To overcome this disadvantage, it has been proposed to deposit, before the shaping in the draw-plates and the rolling-mill, a layer of a ductile material, and in particular of copper, on the blank made of Nb—Ti.

This layer of copper on the wire has a disadvantage: it must be deposited in a thick layer (typically 10 microns for a diameter of Nb—Ti of 0.1 mm) to play its role of anti-sticking agent during the steps of forming. It does not allow fine control of the geometry of the wire during the calibration and the rolling of the wire. These dimensional variations of the core made of Nb—Ti of the wire translate into significant variations in the torque of the balance-springs.

SUMMARY OF THE INVENTION

To overcome the aforementioned disadvantages, the present invention proposes a method for manufacturing a balance-spring that allows to facilitate the shaping by forming while avoiding the disadvantages related to the layer of copper.

For this purpose, the invention relates to a method for manufacturing a balance-spring intended to equip a balance of an horological movement, comprising:

a) a step of making available a blank with a core made of Nb—Ti made from an alloy consisting of:

niobium: balance to 100% by weight, titanium: between 5 and 95% by weight, traces of one or more elements chosen from the group consisting of O, H, C, Fe, Ta, N, Ni, Si, Cu and Al, each of said elements being present in a quantity between 0 and 1600 ppm by weight, the total quantity formed by all of said elements being between 0% and 0.3% by weight, b) a step of forming a layer of a first material having a first thickness around the blank with the core made of Nb—Ti, c) a step of forming a layer of a second material having a second thickness greater than the thickness of the layer of the first material around the blank obtained from step b), the first and second materials being chosen so that the second material can be selectively eliminated physically or chemically without substantially attacking the first material d) a step of forming the blank in several sequences comprising:

d1) a succession of forming-stage steps for transforming the blank obtained in step c) into a round blank having a determined diameter called calibration diameter and d2) a succession of steps of flat rolling the round blank obtained in step d1)

e) a step of cutting the rolled wire into blades having a determined length f) a step of winding to form the balance-spring, g) a step of final heat treatment of the balance-spring, and where said method further comprises a step h) of removing said layer of the second material formed in step c), when the blank has reached a diameter such that it is still possible to pass said blank at least through one draw-plate and preferably through two draw-plates with a degree of elongation of the blank of approximately 10% at each draw-plate before the first rolling step d2) or at the latest before the last stage of step d2).

Since the blank undergoes a large number of forming stages to bring it to determined dimensions and geometry, the blank must be coated with a layer preventing sticking in the successive draw-plates sufficiently thick to not be deteriorated during these successive forming-stages. To do this, according to the invention, the blank is coated with a layer of a ductile material such as copper. The thickness of the layer of copper for creating horological balance-springs is approximately 10 microns. The applicant nevertheless noted that the outer dimensions of the blank covered by the layer of copper were well controlled during the successive stages of forming of the blank but on the other hand that the dimensions of the core made of Nb—Ti were not controlled. The applicant thus had the inventive idea of coating the blank made of Nb—Ti with a fine layer (typically chosen between 800 nm and 1.2 microns when the blank has reached a diameter between 15 and 50 microns) of a first anti-sticking material and preferably compatible with the thermoelastic coefficient (TEC) of the core made of Nb—Ti, before coating the blank with a layer of a second ductile material thicker than the layer of the first material to carry out the first steps of forming then eliminating the “thick” layer of the second material before the final steps while preserving the “fine” layer of the first material. This “fine” layer allows to carry out the final steps of forming of the wire without sticking in the draw-plates while perfectly controlling the dimensions of the core made of Nb—Ti.

The first material is preferably chosen from the set comprising niobium, gold, tantalum, vanadium, the austenitic stainless steels, 316L-grade steel, and the second material is chosen from the set comprising copper, silver, the alloys of copper and of nickel, the single-phase alpha alloys of copper and of zinc (for example CuZn30).

Advantageously the first material is niobium and the second material is copper (grade ETP (electrolytic tough pitch), OF (oxygen-free) or OFE (oxygen free electronic), for example).

A preferred embodiment of the method for manufacturing the balance-spring according to the invention thus includes a step aiming to form a fine layer of niobium coating the core made of Nb—Ti, then to form a thick layer of copper, to partly form the coated core, to remove the remaining layer of Cu, then to finish the forming of the core made of Nb—Ti simply coated with niobium. This layer of niobium thus forms the outer layer that is in contact with the draw-plates and the nip-rolls. It is chemically inert and ductile and easily allows to draw and roll the balance-spring wire. It has another advantage of facilitating the separation between the balance-springs after the step of fixing following the step of winding.

The layer of niobium is preserved on the balance-spring at the end of the manufacturing method. It is sufficiently fine with a thickness between 50 nm and 5 μm and preferably 200 nm and 1.5 μm and more preferably between 800 nm and 1.2 μm to not significantly modify the thermoelastic coefficient (TEC) of the balance-spring. Moreover, the Nb has a TEC similar to that of Nb—Ti, which facilitates obtaining a compensator balance-spring.

It is moreover perfectly adherent to the core made of Nb—Ti. These thicknesses of the layer of niobium are typically adapted for cores made of Nb—Ti having diameters between 15 and 100 μm.

Advantageously, step d1) of the method of the invention involves cold forming the blank obtained in step c) by hammering and/or drawing.

According to a preferred embodiment of the method of the invention at least before step d1) and/or d2) a step of hardening of the beta type of said blank is carried out, in such a way that the titanium of said alloy is substantially in the form of a solid solution with the niobium in beta phase and preferably, the step of β hardening is a solution treatment, with a duration between 5 minutes and 2 hours at a temperature between 700° C. and 1000° C., under vacuum, followed by cooling under gas.

Preferably, when the second material is copper, the step of removing the layer of the second material is carried out by chemical attack in a solution containing cyanides or acids, for example nitric acid.

Advantageously, the final heat treatment of step g) is a treatment of precipitation of the titanium in alpha phase having a duration between 1 hour and 80 hours at a temperature between 350° C. and 700° C., preferably between 5 hours and 30 hours between 400° C. and 600° C.

Preferably, step g) consists of a heat treatment of precipitation of the titanium in alpha phase having a duration between 1 hour and 80 hours at a temperature between 350° C. and 700° C., preferably between 5 hours and 30 hours between 400° C. and 600° C. According to an alternative, an intermediate heat treatment of precipitation of the titanium in alpha phase having a duration between 1 hour and 80 hours at a temperature between 350° C. and 700° C., preferably between 5 hours and 30 hours between 400° C. and 600° C. can further be carried out after each or certain sequences of the forming step d1) and/or d2).

According to one embodiment of the method the layer of the second material, typically of copper, formed in step c) has a thickness between 1 μm and 100 μm when the diameter of the core of the wire made of Nb—Ti is equal to 100 μm.

Preferably, each sequence of steps d1) and/or d2) is carried out with a degree of deformation between 1 and 5, the overall total of the forming steps over all of the sequences leading to a total degree of deformation between 1 and 14. The degree of deformation for each sequence g) corresponds to the conventional formula 2ln(d0/d), where d0 is the diameter of the last beta hardening, and where d is the diameter of the cold-worked wire.

Advantageously the step b) of forming the layer of the first material, typically a layer of niobium, is carried out by winding a strip of the first material, for example of niobium, around the core made of Nb—Ti and the step c) of forming the layer of the second material, typically a layer of copper, is carried out by inserting the blank obtained at the end of step b) into a tube of the second material, for example of copper, followed by drawing and/or hammering the assembly of the tube and of the blank obtained at the end of step b).

The invention also relates to a balance-spring intended to equip a balance of an horological movement, comprising a core made of Nb—Ti made from an alloy consisting of:

niobium: balance to 100% by weight, titanium: between 5 and 95% by weight, traces of elements chosen from the group consisting of O, H, C, Fe, Ta, N, Ni, Si, Cu, Al, each of said elements being present in a quantity between 0 and 1600 ppm by weight, the total quantity formed by all of said elements being between 0% and 0.3% by weight, wherein the core made of Nb—Ti is coated with a layer of a first material chosen from the set comprising niobium, gold, tantalum, vanadium, the austenitic stainless steels, (316L-grade steel), said layer of the first material having a thickness between 20 nm and 10 μm.

Advantageously, the layer of the first material has a thickness between 300 nm and 1.5 μm and preferably between 400 nm and 800 nm.

According to a preferred embodiment, the first material is niobium.

Advantageously, the concentration of Ti is between 40 and 65% by weight, preferably between 40 and 49% by weight and more preferably between 46 and 48% by weight.

Advantageously, the core made of Nb—Ti has a two-phase microstructure including niobium in beta phase and titanium in alpha phase.

Preferably the spring has an elastic limit greater than or equal to 500 MPa, preferably to 600 MPa, and a modulus of elasticity less than or equal to 120 GPa, preferably less than or equal to 100 GPa.

DETAILED DESCRIPTION OF THE INVENTION

The invention relates to a method for manufacturing a balance-spring intended to equip a balance of an horological movement. This balance-spring is made from an alloy of the binary type including niobium and titanium. It also relates to the balance-spring coming from this method.

The method will be described more precisely below with niobium as a first material and copper as a second material.

According to the invention, the manufacturing method includes the following steps:

a) a step of making available a blank with a core made of Nb—Ti made from an alloy consisting of:

niobium: balance to 100% by weight, titanium: between 5 and 95% by weight, traces of one or more elements chosen from the group consisting of O, H, C, Fe, Ta, N, Ni, Si, Cu and Al, each of said elements being present in a quantity between 0 and 1600 ppm by weight, the total quantity formed by all of said elements being between 0% and 0.3% by weight, b) a step of forming a layer of niobium around the blank with the core made of Nb—Ti, c) a step of forming a layer of copper around the blank obtained from step b), d) a step of forming the blank in several sequences comprising:

d1) a succession of forming-stage steps to bring the blank obtained in step c) to a determined diameter called calibration diameter and d2) a succession of steps of flat rolling the round blank obtained in step d1), e) a step of cutting the rolled wire into blades having a determined length, f) a step of winding to form the balance-spring, g) a step of final heat treatment of the balance-spring.

The method of the invention further comprises a step h) of removing said layer of copper formed in step c), at a moment of step c) at which the blank has reached a diameter such that it is still possible to pass said blank at least through one draw-plate and preferably through two draw-plates with a degree of elongation of the blank of approximately 10% at each draw-plate before the first rolling step d2) or at the latest before the last stage of step d2).

The method will now be described in more detail.

In step a), the core is made from an Nb—Ti alloy including between 5 and 95% by weight of titanium. Advantageously, the alloy used in the present invention comprises by weight between 40 and 60% of titanium. Preferably, it includes between 40 and 49% by weight of titanium, and more preferably between 46% and 48% by weight of titanium. The percentage of titanium is sufficient to obtain a maximum proportion of precipitates of Ti in the form of alpha phase while being reduced to avoid the formation of martensitic phase leading to problems of fragility of the alloy during its implementation.

In a particularly advantageous manner, the Nb—Ti alloy used in the present invention does not comprise other elements except for possible and inevitable traces. This allows to avoid the formation of fragile phases.

More particularly, the concentration of oxygen is less than or equal to 0.10% by weight of the total, or even less than or equal to 0.085% by weight of the total.

More particularly, the concentration of tantalum is less than or equal to 0.10% by weight of the total.

More particularly, the concentration of carbon is less than or equal to 0.04% by weight of the total, in particular less than or equal to 0.020% by weight of the total, or even less than or equal to 0.0175% by weight of the total.

More particularly, the concentration of iron is less than or equal to 0.03% by weight of the total, in particular less than or equal to 0.025% by weight of the total, or even less than or equal to 0.020% by weight of the total.

More particularly, the concentration of nitrogen is less than or equal to 0.02% by weight of the total, in particular less than or equal to 0.015% by weight of the total, or even less than or equal to 0.0075% by weight of the total.

More particularly, the concentration of hydrogen is less than or equal to 0.01% by weight of the total, in particular less than or equal to 0.0035% by weight of the total, or even less than or equal to 0.0005% by weight of the total.

More particularly, the concentration of silicon is less than or equal to 0.01% by weight of the total.

More particularly, the concentration of nickel is less than or equal to 0.01% by weight of the total, in particular less than or equal to 0.16% by weight of the total.

More particularly, the concentration of ductile material, such as copper, in the alloy is less than or equal to 0.01% by weight of the total, in particular less than or equal to 0.005% by weight of the total.

More particularly, the concentration of aluminium is less than or equal to 0.01% by weight of the total.

During a step b) the core made of Nb—Ti of the blank in step a) is coated with a layer of niobium. The addition of the layer of niobium around the core can be carried out galvanically, by PVD, CVD or mechanically. In the latter case, a tube of niobium is fitted onto a bar of the alloy made of Nb—Ti. The assembly is formed by hammering and/or drawing to thin the bar and form the blank which was made available in step a). The thickness of the layer of niobium is chosen so that the ratio surface of niobium/surface of the core made of Nb—Ti for a given cross-section of wire is less than 1, preferably less than 0.5, and more preferably between 0.01 and 0.4. For example, the thickness is preferably between 1 and 500 micrometres for a wire having a total diameter of 0.2 to 1 millimetre.

Alternatively, the layer of niobium can be made by winding a strip of niobium around the core made of Nb—Ti, the strip of niobium/core made of Nb—Ti assembly being then formed by hammering and/or drawing to thin the bar and form the blank which was made available at the end of step a).

The core made of Nb—Ti of the blank obtained in step b) is coated with a layer of copper during a step c). The addition of the layer of copper around the core can be carried out galvanically, by PVD, CVD or mechanically. In the latter case, a tube of copper is fitted onto a bar of the alloy made of Nb—Ti coated with the layer of niobium. The assembly is formed by hammering and/or drawing to thin the bar and form the blank which was made available at the end of step b). The thickness of the layer of copper is chosen in such a way that the ratio surface of copper/surface of the core made of Nb—Ti coated with the layer niobium for a given cross-section of wire is less than 1, preferably less than 0.5, and more preferably between 0.01 and 0.4. For example, the thickness is preferably between 1 and 500 micrometres for a wire having a total diameter of 0.2 to 1 millimetre.

Alternatively, the layer of copper can be made by winding a strip of copper around the core made of Nb—Ti coated with the layer of niobium, the strip of niobium/core made of Nb—Ti assembly being then formed by hammering and/or drawing to thin the bar and form the blank which was made available at the end of step b).

According to yet another alternative, the core made of Nb—Ti coated with the niobium strip can be inserted into a tube of copper, the assembly being hot co-extruded at a temperature of approximately 600 to 900 degrees through a draw-plate.

A hardening of the beta type consisting of a solution treatment is carried out at least before the later forming steps. This treatment is carried out in such a way that the titanium of the alloy is substantially in the form of a solid solution with the niobium in beta phase. Preferably, it is carried out for a duration between 5 minutes and 2 hours at a temperature between 700° C. and 1000° C., under vacuum, followed by cooling under gas. More particularly, this beta hardening is a solution treatment at 800° C. under vacuum for 5 minutes to 1 hour, followed by cooling under gas.

The step d) of forming is carried out in several sequences. Forming means forming by drawing and/or rolling.

Advantageously, the forming step includes at least successively sequences of forming, preferably cold, by hammering and/or drawing and/or calibration drawing designated by step d1). Step d1) allows to bring the blank obtained at the end of step c) to a determined diameter called calibration diameter of the wire.

According to the invention, the method further comprises a step h) which involves removing the layer of copper formed in step c), when during step d1), the blank has reached a diameter such that it is still possible to pass said blank at least through one draw-plate with a degree of elongation of the blank of approximately 10% before the first later rolling step d2). This step of removing the layer of copper is carried out by chemical attack in a solution containing cyanides or acids, for example in a bath of nitric acid at a concentration of 53% by weight in water.

A sequence of rolling operations, preferably with a rectangular profile compatible with the input cross-section of a winding spindle, is then carried out, this sequence forming step d2).

Each sequence of steps d1) and d2) is carried out with a given degree of forming between 1 and 5, this degree of forming corresponding to the conventional formula 2In(d0/d), where d0 is the diameter of the last beta hardening, and where d is the diameter of the cold-worked wire. The overall total of the forming steps over this entire succession of sequences leads to a total degree of forming between 1 and 14.

At the end of step d2), the layer of niobium coating the core made of Nb—Ti has a thickness between 20 nm and 10μm, preferably between 300 nm and 1.5 μm, more preferably between 400 and 800 nm.

The wire rolled into a blade obtained at the end of step d2) is then cut to a determined length during step e).

The step f) of winding to form the balance-spring is followed by the step g) of final heat treatment of the balance-spring. This final heat treatment is a treatment of precipitation of the Ti in alpha phase having a duration between 1 and 80 hours, preferably between 5 and 30 hours, at a temperature between 350 and 700° C., preferably between 400 and 600° C.

According to an advantageous alternative the method can further include, between each sequence or between certain sequences of the forming steps d1) and/or d2), an intermediate heat treatment of precipitation of the titanium in alpha phase having a duration between 1 hour and 80 hours at a temperature between 350° C. and 700° C., preferably between 5 hours and 30 hours between 400° C. and 600° C. Advantageously, this intermediate treatment is carried out in step d1) between the first drawing sequence and the second calibration-drawing sequence.

The balance-spring made according to this method has an elastic limit greater than or equal to 500 MPa, preferably greater than 600 MPa, and more precisely between 500 and 1000 MPa. Advantageously, it has a modulus of elasticity less than or equal to 120 GPa, preferably less than or equal to 100 GPa.

The balance-spring includes a core made of Nb—Ti coated with a layer of niobium, said layer having a thickness between 50 nm and 5 μm, preferably between 200 nm and 1.5 μm, more preferably between 800 nm and 1.2 μm.

The core of the balance-spring has a two-phase microstructure including niobium in beta phase and titanium in alpha phase.

Moreover the balance-spring made according to the invention has a thermoelastic coefficient, also called TEC, allowing it to guarantee the preservation of the chronometric performance despite the variation in the temperatures of use of a watch incorporating such a balance-spring.

The method of the invention allows to create, and more particularly to shape, a balance-spring for a balance made of an alloy of the niobium-titanium type, typically at 47% by weight of titanium (40-60%). This alloy has increased mechanical properties, by combining a very high elastic limit, greater than 600 MPa, with a very low modulus of elasticity, approximately 60 GPa to 80 GPa. This combination of properties is well suited to a balance-spring. Moreover, such an alloy is paramagnetic.

The invention claimed is:

1. A balance-spring intended to equip a balance of an horological movement, comprising a core made of Nb—Ti made from an alloy consisting of:

niobium: remainder to 100% by weight, titanium: between 5 and 95% by weight, traces of elements chosen from the group consisting of O, H, C, Fe, Ta, N, Ni, Si, Cu, Al, each of said elements being present in a quantity between 0 ppm and 1600 ppm by weight, the total quantity formed by all of said elements being between 0% and 0.3% by weight, wherein the core made of Nb—Ti is coated with a layer of an austenitic stainless steel, said layer of the first material having a thickness between 200 nm and 10 μm.

2. The balance-spring according to claim 1, wherein the layer of the austenitic stainless steel has a thickness between 300 nm and 1.5 μm.

3. The balance-spring according to claim 1, wherein the layer of the austenitic stainless steel has a thickness between 400 nm and 800 nm.

4. The balance-spring according to claim 1, wherein the concentration of Ti is between 40% and 65% by weight, between 40% and 49% by weight or between 46% and 48% by weight.

5. The balance-spring according to claim 1, wherein the core made of Nb—Ti has a two-phase microstructure including niobium in beta phase and titanium in alpha phase.

6. The balance-spring according to claim 1, which has an elastic limit greater than or equal to 500 MPa or to 600 MPa, and a modulus of elasticity less than or equal to 120 GPa, or less than or equal to 100 GPa.

* * * * *